United States Patent
Bayer et al.

(10) Patent No.: US 11,520,759 B2
(45) Date of Patent: Dec. 6, 2022

(54) PROCESSING TIME SERIES METRICS DATA

(71) Applicant: salesforce.com, inc., San Francisco, CA (US)

(72) Inventors: Christian Bayer, Cambridge, MA (US); Sergei Babovich, Arlington, MA (US); Dmitry Babenko, Shrewsbury, MA (US); Ben Susman, Waltham, MA (US); Shanmugavel Ponnusamy, Lexington, MA (US)

(73) Assignee: salesforce.com, inc., San Francisco, CA (US)

( * ) Notice: Subject to any disclaimer, the term of this patent is extended or adjusted under 35 U.S.C. 154(b) by 775 days.

(21) Appl. No.: 16/396,516

(22) Filed: Apr. 26, 2019

(65) Prior Publication Data

US 2020/0341956 A1  Oct. 29, 2020

(51) Int. Cl.
  *G06F 16/21*  (2019.01)
  *G06F 16/2458*  (2019.01)
  *G06F 16/2455*  (2019.01)
  *G06F 16/22*  (2019.01)

(52) U.S. Cl.
  CPC ........ *G06F 16/219* (2019.01); *G06F 16/2246* (2019.01); *G06F 16/2477* (2019.01); *G06F 16/24564* (2019.01)

(58) Field of Classification Search
  CPC .............. G06F 16/219; G06F 16/2246; G06F 16/2477; G06F 16/24564
  See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

"Amazon CloudWatch—Application and Infrastructure Monitoring", Overview, downloaded from https://aws.amazon.com/cloudwatch/, Aug. 27, 2019, 13 pages.

(Continued)

*Primary Examiner* — Huawen A Peng
(74) *Attorney, Agent, or Firm* — Polygon IP, LLP (57) ABSTRACT

Embodiments of the present invention include a method of processing time series metrics (TSM) data. The method includes receiving a TSM data point for a metric, the TSM data point indicating an identifier (ID) of the metric, getting a persistence policy associated with the metric, selecting a first resolution database according to the persistence policy, storing the TSM data point in the first resolution database, selecting a second resolution database according to the persistence policy; and when the second resolution database is defined, storing the TSM data point in a staging file for the second resolution database.

26 Claims, 7 Drawing Sheets

(56) References Cited

U.S. PATENT DOCUMENTS

| | | | |
|---|---|---|---|
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 10,944,655 B2 * | 3/2021 | Borah ............... G06F 11/3082 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2016/0034504 A1 * | 2/2016 | Borah .................. G06F 16/22 |
| | | | 707/812 |
| 2016/0189186 A1 * | 6/2016 | Fabrikant ........... G06Q 30/0205 |
| | | | 705/7.34 |
| 2017/0324802 A1 * | 11/2017 | Kim .................. H04L 41/5032 |
| 2019/0146960 A1 * | 5/2019 | Beedgen ............... G06F 16/258 |
| | | | 707/741 |
| 2019/0146978 A1 * | 5/2019 | Beedgen ................. G06F 16/24 |
| | | | 707/754 |
| 2019/0258677 A1 * | 8/2019 | Beedgen ............. G06F 16/9017 |

OTHER PUBLICATIONS

"Cyanite: cassandra backed Carbon daemon and metric storage web service. IPONWEB repository", downloaded from https://github.com/cybem/cyanite-iow, Aug. 27, 2019, 4 pages.

"Datadog—See it all in one Place", New announcement from Dash! downloaded from https://www.datadoghq.com/, Aug. 27, 2019, 9 pages.

"Go-Carbon", downloaded from https://github.com/go-graphite/go-carbon, Aug. 27, 2019, 17 pages.

"KairosDB Cassandra-based general purpose time series database", downloaded from https://kairosdb.github.io/, Apr. 5, 2019, 2 pages.

"Log-structured merge-tree", downloaded from https://en.wikipedia.org/wiki/Log-structured_merge-tree, Apr. 5, 2019, 2 pages.

"Project Carbon Cache Overview What Graphite is and is not", downloaded from https://graphite.readthedocs.io/en/latest/overview.html, Apr. 5, 2019, 2 pages.

"The modern engine for Metrics and Events—The Leading Time Series Platform", downloaded from https://www.influxdata.com/, Apr. 5, 2019, 2 pages.

"The Scalable Time Series Database—Store and serve massive amounts of time series data without losing granularity.", Download 2.4.0, downloaded from http://opentsdb.net/, Apr. 5, 2019, 2 pages.

O'Neil, et al, "The Log-Structured Merge Tree (LSM tree)", Acta Informatica, Jun. 1996, vol. 33, Issue 4, pp. 351-385.

Stackdriver, "GCP Metrics", downloaded from https://cloud.google.com/monitoring/api/metrics_gcp, Apr. 5, 2019, 8 pages.

* cited by examiner

PROCESSING TIME SERIES METRICS DATA

TECHNICAL FIELD

One or more implementations relate to high volume data processing in a computing system, and more specifically, to processing time series metrics data.

BACKGROUND

A time series is a series of numeric data points of a metric over time. Each time series consists of the metric plus metadata associated with this metric. A metric is any particular measurement of data to be tracked over time. For example, a metric in the context of a cloud computing server may be determining the number of operations accessing a system resource by a set of users per unit time.

Time series metrics data points are often stored in a computer database. The database may be resident on a storage device such as a hard disk drive (HDD) or a solid-state drive (SSD). A typical write strategy for storing the time series metrics data points results in highly random disk input/output (I/O) operations. When the number of time series metrics data points per unit time grows very large, as in the case for some cloud computing data center metrics, the random nature of these I/O operations causes the storage of the time series metrics data points to scale poorly and become unsustainable.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes a method and apparatus for implementing a time series metrics (TSM) data store using Log-Structured-Merge (LSM) trees and co-locating data by series to perform sequential disk writes. This results in a scalable and efficient way of storing the TSM data on inexpensive magnetic disks and supporting loss-less restarts without external dependencies. Embodiments of the present invention provide high performance read and write throughput and support writing millions of TSM data points and serve millions of TSM data points per minute with low query latency.

Embodiments of the present invention "sequentialize" the random write input/output (I/O) operations typically generated by TSM data processing systems. TSM data processing systems write one or more files for each metric to one or more storage devices (e.g., HDDs and/or SSDs). These files are updated according to the frequency of the arriving metrics data. In some scenarios, the amount of data processed is on the order of millions of TSM data points per minute. A TSM data processing system typically needs to write millions of files to storage in a random order. On aggregation these files need to be rewritten as well when a higher resolution of certain TSM data gets transformed into a lower resolution, causing even more data storage churn. Embodiments of the present invention use a database embedded in the TSM data processor system process to store all TSM data points once per interval and in different buckets for different resolutions, thereby avoiding churn during aggregation.

In an embodiment, a Log-Structured-Merge (LSM) tree data structure is used to store TSM data points. In an embodiment, TSM data points arrive at regular intervals, such as every minute. Since the arrival order of TSM data points is non-deterministic, using an LSM tree to store these TSM data points helps to ensure that TSM data points are written out in batches into the C1 structure of the LSM tree. In an embodiment, instead of organizing TSM data points by time, TSM data points are co-located by series when stored. This allows the LSM tree to store the TSM data points more effectively.

In embodiments, the LSM tree database is a key/value store. A key is defined as ("metric-id", "timestamp") and a TSM data point value is the value of the record. In an embodiment, one TSM data point per metric is received every minute. The LSM tree accumulates data in memory and then writes the data to disk files "as-is", resulting fast storage rates. Embodiments of the present invention write data into the LSM tree as the TSM data points arrive instead of finding the right place for each TSM data point in the LSM tree at the time each data point is written (using slower random disk I/O). The files are processed by the LSM tree to organize records by key at a later time in batches (resulting in faster sequential disk I/O). One trade-off is that a read operation is more expensive since the LSM tree needs to check multiple files for a requested TSM data point. But in case of a time series database (such as the LSM tree used herein), there are a lot more writes than reads. The record key that is chosen to use ensures that in the LSM tree files TSM data points that belong to the same metric will be stored in the same file next to each other so the LSM tree will be able to process read requests such as "find data points for metric A for the last 24 hours" will be processed more quickly than in other approaches. Also, the LSM tree of embodiments of the present invention is designed to be embedded into various types of applications and exposes a variety of different tuning parameters.

TSM data processing systems typically aggregate sets of higher resolution TSM data points into sets of lower resolution TSM data points at predefined intervals. This aggregation operation results in reading and writing files entirely every time an interval boundary is reached. In contrast, embodiments of the present invention use separate groups of TSM data points for different aggregation resolutions. TSM data points are moved into lower resolution groups that are stored separately from higher resolution groups.

In order to be able to efficiently retrieve TSM data points from the LSM tree, embodiments build indexes on top of the LSM tree to speed up query processing as well as to perform validation. Embodiments support user queries by fully-qualified metric namespaces, including the use of wildcards.

To effectively query using these inputs, embodiments implement indexes built on top of the TSM data points and the metric names. These indexes are logical indexes, that is they are built on top of the LSM tree database for this specific purpose.

Although it may be possible in some embodiments to use an alternate storage backend solution that also uses an LSM tree for storing TSM data, this results in the presence of an external database running on another computing cluster in a large cloud computing data center. This requires additional computing resources in the data center and results in data storage delays to write the TSM data into other cluster members. Embodiments provide an integrated solution that operates standalone without the requirement of an external database. This minimizes operational efforts and allows for straightforward scaling of the TSM data points processing.

Embodiments of the present invention also provide support for "sharding" by metric namespace to facilitate scaling out of disk writes. Sharding is a type of database partitioning that separates very large databases into smaller, faster, more easily managed parts called data shards. Metrics namespaces are used as sharding keys. Embodiments maintain full compatibility with existing open source TSM systems without any changes being needed to interface with existing implementations.

Embodiments provide support for restarts and outages of the storage backend without losing data points through the use of a queue instead of a classical forwarding of data. After startup, embodiments prioritize processing of live real-time data while catching up in the background on TSM data points that were not yet processed due to a restart or outage and thus not persisted to disk. The latest TSM data points will be available right away for further processing while the gap is being backfilled. In this way embodiments can recover even from sustained outage periods while still providing real-time data immediately. This is advantageous for computing systems providing real-time alerts derived from processing these TSM data points. Otherwise, the real-time alerts would be rendered useless until the TSM data processing is completely caught up. Embodiments of the present invention thus provide an advantage over how other time series databases typically handle these recovery scenarios.

Figure 1:
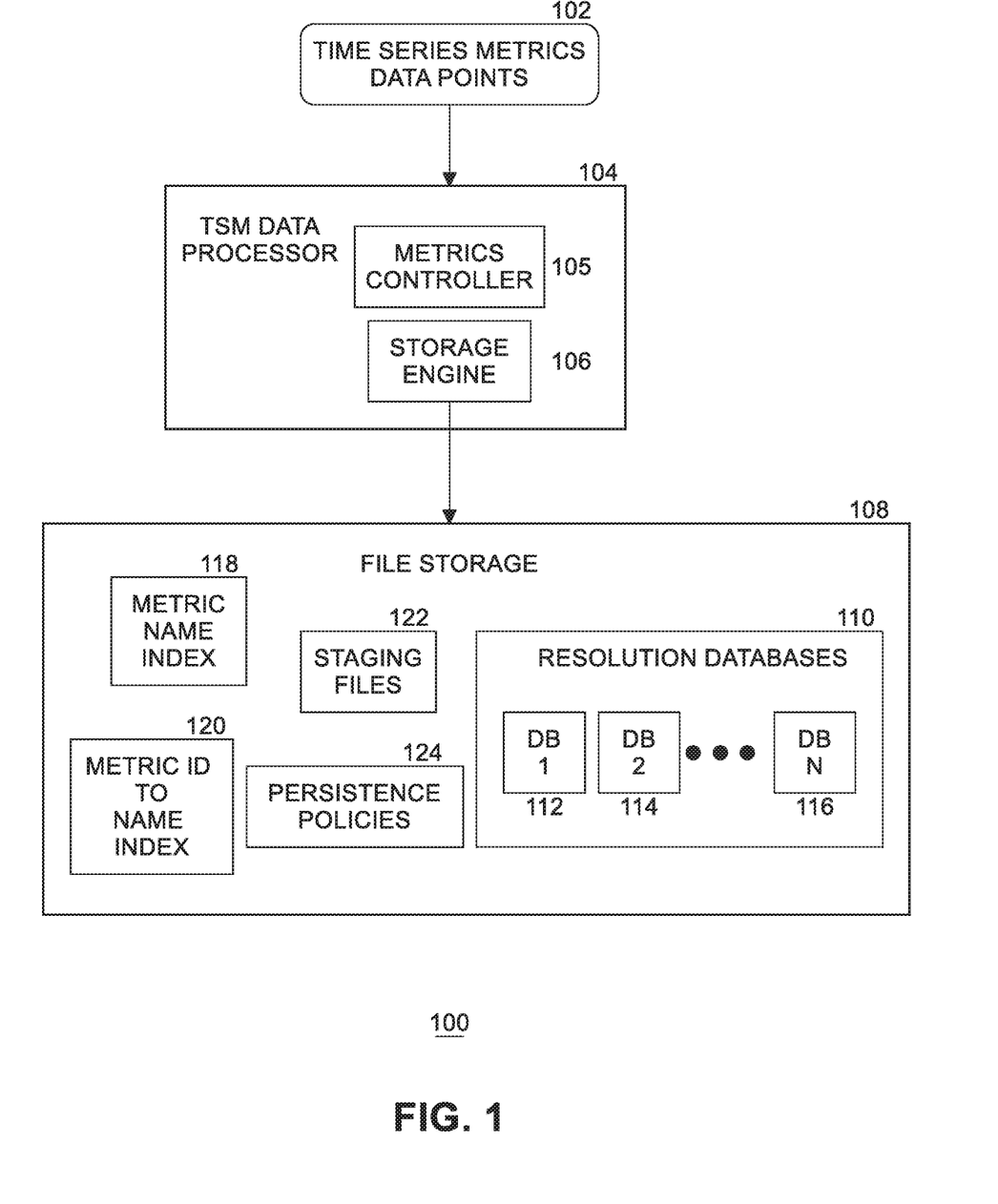
FIG. 1 is a diagram of a system for processing time series metrics data according to an embodiment.

FIG. 1 is a diagram of a system 100 for processing time series metrics (TSM) data according to an embodiment. A plurality of TSM data points 102 are received and processed by TSM data processor 104. TSM data processor 104 comprises metrics controller 105 and storage engine 106. A TSM data point comprises a metric name (e.g., text such as {a.b.c.d}), a timestamp (e.g., Unix epoch time), and a value (e.g., a floating-point value such as 1.02). In an embodiment, TSM data processor 104 is executed in a process within a Java™ virtual machine (JVM) hosted on a computer system (e.g., a computer server in a cloud computing data center). In an embodiment, there may be multiple instances of TSM data processor 104 running on one or more host computer systems. Metrics controller 105 controls processing of TSM data points as discussed below with reference to FIGS. 2 through 6. TSM data processor 104 includes storage engine 106 to temporarily store TSM data points (e.g., within main memory (random-access memory (RAM) of a host computer system). In an embodiment, storage engine 106 includes an LSM tree data structure to persistently store key-value pairs. In one embodiment, storage engine 106 comprises an open source embedded RocksDB storage engine implemented in the C++ programming language wherein keys and values are arbitrary byte arrays. The keys are ordered within the key value store according to a user-specified comparator function. In an embodiment, storage engine 106 is embedded in the Java™ process running TSM data processor 104 using a Java™ Native Interface (JNI) library to take advantage of a shared memory space. In other embodiments, other databases may be used.

TSM data processor 104 also stores information in file storage 108. In an embodiment, file storage 108 is comprised of one or more of HDDs, SSDs, or a combination of HDDs and SSDs, coupled with TSM data processor 104 using known means (e.g., a communications bus, etc.). TSM data processor 104 manages read and write data access to TSM data points stored in file storage 108. In an embodiment, the accesses are optimized for sequential I/O operations.

File storage 108 includes resolution databases 110, which includes a plurality of databases for storing sets of TSM data points according to a selected resolution. Each entry in a resolution database includes a key field and a value field. Each resolution database is indexed by a key comprising two integers—a metric identifier (ID) and a timestamp. A resolution database entry value field stores a TSM data point value. For example, resolution databases 100 includes first database (DB) 1 112 at a first resolution, second database DB 2 114 at a second resolution lower than the first resolution, . . . DB N 116 at an Nth resolution, the Nth resolution lower than the first resolution, the second resolution, and any intervening resolutions, where N is a natural number. Each resolution database is specified by a resolution and retention pair of values. The resolution defines how often TSM data points are received and the retention defines how long the TSM data points are accumulated. For example, first resolution database DB 1 112 could have a resolution of 60 seconds and a retention of 24 hours, meaning that TSM data points 102 are received for a selected metric once per minute and are accumulated in DB 1 112 for 24 hours (e.g., resulting in 60*60*24=86,400 stored TSM data points). For example, second resolution database DB 2 114 could have a resolution of five minutes and a retention of seven days, meaning that TSM data points 102 are received for a selected metric once every five minutes and are accumulated in DB 2 114 for seven days (e.g., resulting in 12*24*7=2,016 stored TSM data points). For example, an Nth resolution database DB N 116 could have a resolution of 30 minutes and a retention of two years, meaning that TSM data points 102 are received once per half hour and are accumulated in DB N 116 for two years (e.g., resulting in 2*24*365*2=35,400 stored TSM data points). In various embodiments there can be any number of resolution databases storing any combination of resolution and retention pairs.

In an embodiment, TSM data processor 104 never reads resolution databases 110 as part of the TSM data points storage processing. Embodiments avoid any reads or updates on the existing time series data. This is different from typical time series databases that would try to put multiple values for the same metric within the same record (e.g., a lookup and update will be needed). These prior solutions try to optimize for space by using different approaches to compact a sequence of time/values. In contrast, embodiments of the present invention avoid random access I/O operations (e.g., record lookup or update) so resolution database records are "immutable" and accessed only when time series data is queried. Resolution databases are not queried during a write path.

In an embodiment, resolution databases 110 are stored in a RocksDB database. In other embodiments, other databases may be used. File storage 108 includes metric name index 118 (e.g., name-index/). Embodiments map hierarchical metric names into a tree structure similar to a file system structure with non-leaf nodes (e.g., directories) and leaf nodes (e.g., files). For example, two metric names "a.b.c" and "a.b.d" will be stored in four entries in metric name index 118: "a"-→"b"-→"c", "d". In an embodiment, metric name is a text string. File storage 108 includes metric ID to name index 120 (e.g., id-index/). Embodiments use metric ID to name index 120 to map a metric ID to a metric name. In an embodiment, metric ID is an integer. In an embodiment, metric name index 118 and metric ID to name index 120 are stored in a RocksDB database. In other embodiments, other databases may be used. File storage 108 includes staging files 122. In an embodiment, staging files are text files used to accumulate TSM data points to be aggregated. The use of text files allows metrics controller 105 to employ existing highly efficient Linux™ file sort operations (in one embodiment) on staging files 122. In an embodiment, each line of a staging file includes a TSM data point having a metric ID and a value. File storage 108 also includes one or more persistence policies 124. Each persistence policy defines rules for storing TSM data points. In an embodiment, a persistence policy includes one or more attributes such as a rule for matching a metric name (e.g., *.ecom.*, for example, using "*" as a wildcard matching operation), and a rule for specifying time resolution and retention (e.g., 60 seconds/24 hours, 5 minutes/7 days, or 30 minutes/2 years).

Figure 2:
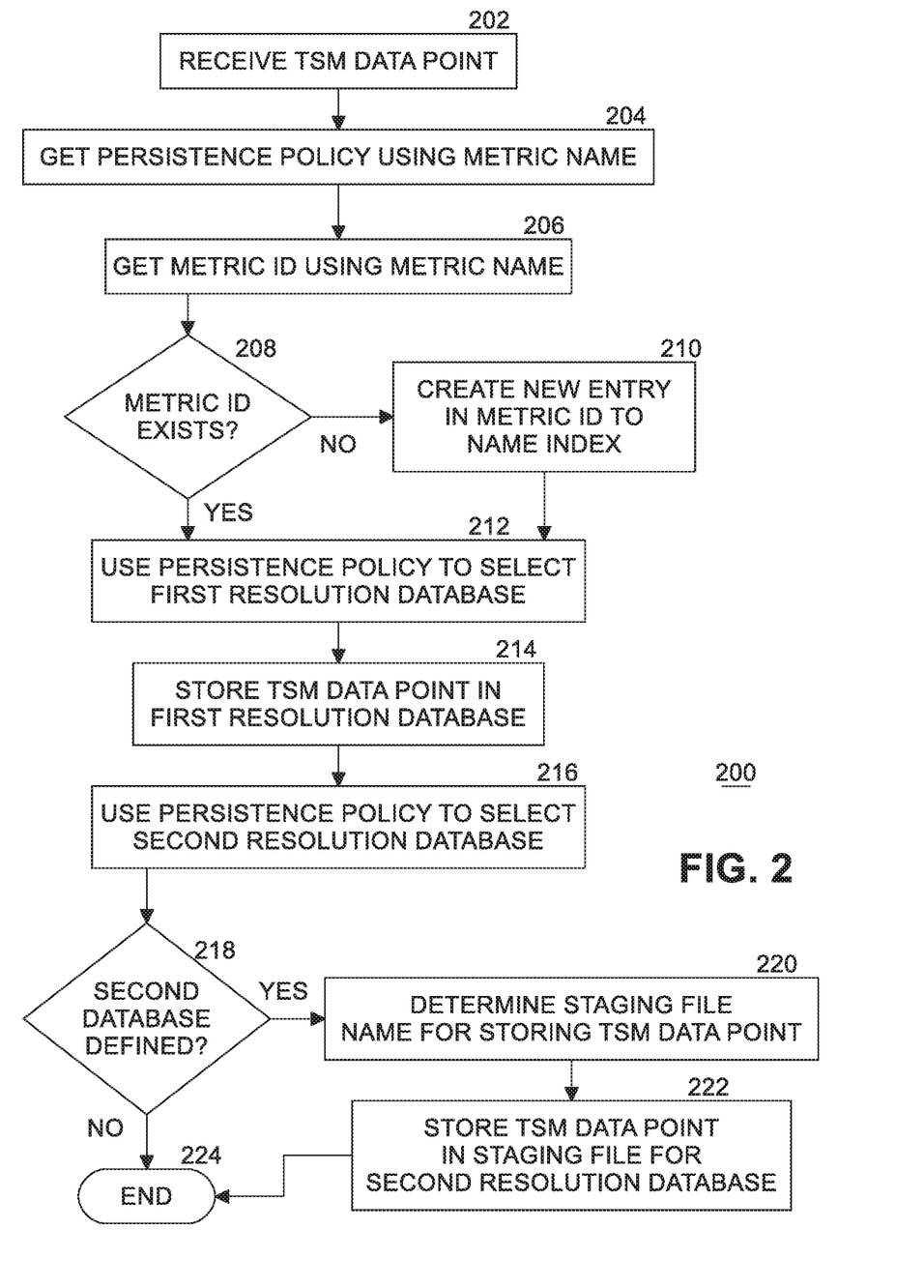
FIG. 2 is a flow diagram of storing time series metrics data points according to an embodiment.

FIG. 2 is a flow diagram 200 of storing time series metrics data points according to an embodiment. At block 202, metrics controller 105 receives a TSM data point. TSM data points are sent by servers and server processes in regular intervals stating the current value of a given characteristic of a system or subsystem. For example, a TSM data point could be the current number of active users on an ecommerce system. This data can then be visualized to determine the state of health of such a system or subsystem. At block 204, metrics controller 105 gets a persistence policy 124 from file storage 108 using the metric name obtained from the received TSM data point. The persistent policy 124 specifies the time resolution and retention to be used for the received TSM data point. At block 206, metrics controller 105 gets a metric ID using the metric name. In an embodiment, metrics controller 105 accesses metric ID to metric name index 120 in file storage 108 to obtain the metric ID associated with the metric name for the received TSM data point. In an embodiment, the metric ID is local to an instance of TSM data processor 104. At block 208, metrics controller 105 checks if the metric ID exists. If the metric ID does not yet exist, at block 210 metrics controller creates a new entry in metric ID to name index 120, populates the metric name field of the entry with the metric name of the received TSM data point, and uses the metric ID of the new entry for further processing of the received TSM data point. At block 212, metrics controller 105 uses the persistence policy 124 for the metric obtained at block 204 to select a first resolution database (e.g., one of DB 1 112, DB 2 114, . . . DB N 116) from resolution databases 110 in which to store the received TSM data point. At block 214, metrics controller 105 stores the received TSM data point in the first resolution database. At bock 216, metrics controller 105 uses the persistence policy 124 for the metric to select a second (e.g., next, higher resolution) resolution database (e.g., one of DB 1 112, DB 2 114, . . . DB N 116, but not one chosen at block 212). If the selected second database is not defined at block 218, processing of the received TSM data point ends at block 224. If the selected second database is defined at block 218, then metrics controller 105 determines a selected staging file 122 name for also storing the received TSM data point. The selected staging file is used to store TSM data points to be stored in the second (e.g., next higher resolution) resolution database. In an embodiment, the staging file name encodes a target resolution database name and retention time interval. For example, for a received TSM data point with a timestamp=1553897370 and a resolution time interval=1553897370−(1553897370% (5*60)), the file name could be "5m7d-1553897100". At block 222, metrics controller 105 stores the received TSM data point in the selected staging file 122 for the second resolution database identified by the staging file name (e.g., stores the metric ID of the received TSM data point and the TSM data point's value as text in a line of the selected staging file).

Thus, at every iteration a TSM data point is written in two places: the first (e.g., current) resolution database and the staging file accumulating TSM data points for the second (e.g., next) resolution database. This processing repeats for all supported resolutions. Processing stops when the staging file for the last defined resolution is processed. In an embodiment, a TSM data point is written directly to a resolution database only for the highest resolution database. In all other cases (e.g., for lower resolutions) the TSM data point that is stored in a resolution database calculated from the staging file. For example, if the first (e.g., highest) resolution is 1 minute and the next resolution is 5 minutes, then when the TSM data point arrives the TSM data point will be stored in the first resolution database with a 1 minute resolution and stored in a staging file accumulating data for the second resolution database with a 5 minute resolution. Then 5 to 6 minutes later the staging file will be processed. TSM data points that have to be stored in the 5 minute database are calculated and an aggregation function is applied (based on five 1 minute TSM data points that are in the staging file). The calculated TSM data points are stored in the 5 minute resolution database, and then these TSM data points will also be stored in a staging file for the next defined resolution (for example, a 30 minute resolution database).

Processing of blocks 202 to 224 are repeated for every TSM data point received by metrics controller 10. As can be appreciated, the size of resolution databases 110 and staging files 122 may grow very large over time, resulting in performance loads on devices (e.g., HDDs and/or SSDs) implementing file storage 108. In an embodiment, this fact is an accepted compromise, and the use of disk space is sacrificed in return for improved write performance.

Figure 3:
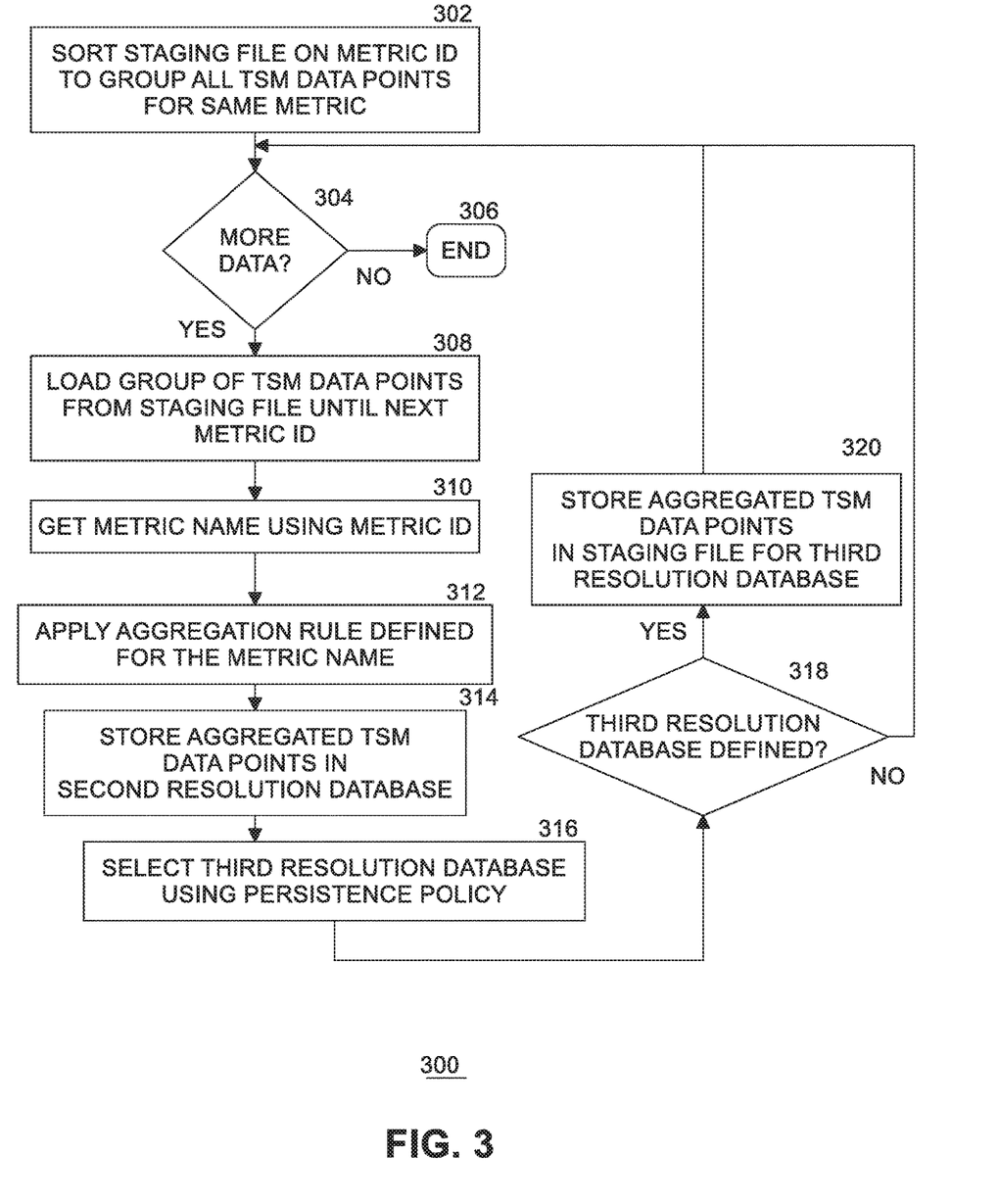
FIG. 3 is a flow diagram of staging time series metrics data points according to an embodiment.

FIG. 3 is a flow diagram 300 of staging time series metrics data points according to an embodiment. Staging is performed at the end of a resolution time interval (e.g., every 1 minute for the 60 seconds/24 hour resolution, and every 5 minutes for the 5 minutes/7 days resolution and so on). In an embodiment, a staging file 122 name comprises a resolution database 110 name and an interval timestamp to use for all TSM data points stored therein. Staging file 122 content comprises TSM data points that belong to the time interval defined by the timestamp and the resolution. In an embodiment, TSM data points are added to a staging file 122 by metrics controller 105 only until the staging file is sorted. After that, if delayed TSM data points arrive, a new staging file is created by metrics controller 105 for the same time interval and both files are sorted and merged together into a single staging file. At block 302, a selected staging file 122 is sorted based at least in part on a metric ID to group all TSM data points for the same metric. In an embodiment, there is one staging file per time interval of a resolution. The staging file includes TSM data points for all metrics for that time interval. For example, for a resolution database with a 5 min resolution, there are 12 separate staging files over 1 hour, and for a resolution database with a 30 minute resolution, there are 2 separate staging files over 1 hour. After sorting, if there is no data yet to be processed in the staging file, processing ends a block 306. In an embodiment, each line in staging file 122 includes a TSM data point. If there is data still to be processed in the staging file 122, then at block 308 metrics controller 105 loads a successive group of TSM data points from the staging file (e.g., successive lines of data in the file) until a next metric ID is encountered in the file. At block 310, metrics controller 105 gets the metric name using the metric ID (e.g., based on metric ID to name index 120 and metric name index 118). In an embodiment, using the metric ID instead of the metric name saves disk space.

At block 312, metrics controller 105 applies an aggregation rule defined for the metric name. Aggregation rules can be configured and are stored on disk. Aggregation can be done differently for each metric on a per-name basis. For example, metric "a.b.c" can have its TSM data points averaged on aggregation while metric "a.b.d" could have its TSM data points summarized. The individual TSM data points for a given time period (e.g., the 5 data points for metric "a.b.c." that arrived over the last 5 minutes) will be merged into one data point "a.b.c" with the value being the average or sum of the 5 individual data points.

At block 314, metrics controller 105 stores the aggregated TSM data points for the group in the appropriate resolution database that applies for this staging file (such as a second resolution database). At block 316, metrics controller 105 selects a third (e.g., new next) resolution database 110 (e.g., a lower resolution database than the current one, that is, one of DB 1 112, DB 2 114, . . . DB N 116) for the group of TSM data points using the persistence policy 124 associated with the metric. If the third (e.g., new next) resolution database is defined at block 318, then metrics controller 105 at block 320 stores the aggregated TSM data points of the group in the staging file 122 associated with the third (e.g., new next) resolution database. Processing continues with the next group (if any) of the original staging file at block 304. If the third resolution database is not defined at block 318, processing continues with the next group (if any) of the original staging file at block 304.

Figure 4:
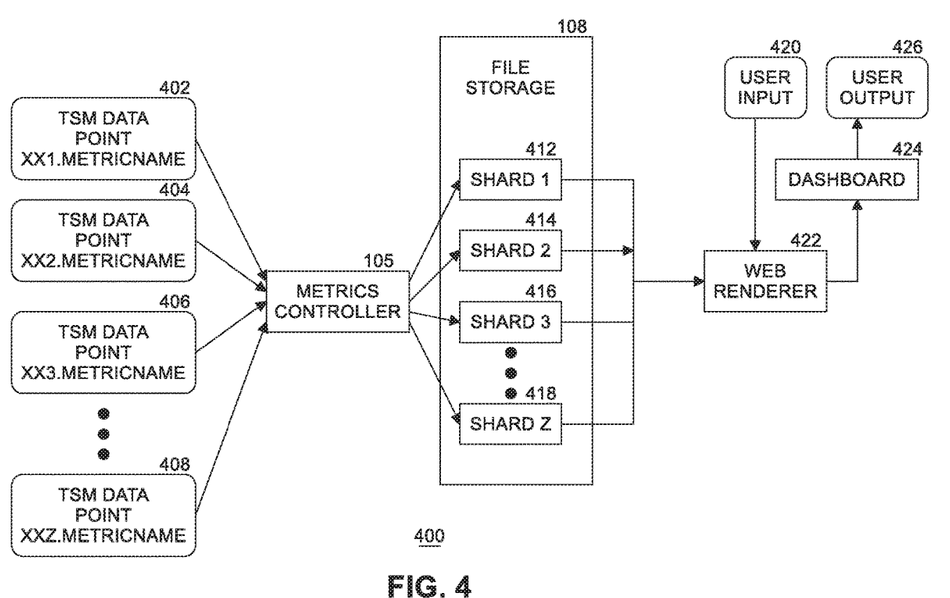
FIG. 4 is a diagram of sharding time series metrics data according to an embodiment.

FIG. 4 is a diagram 400 of sharding according to an embodiment. Sharding is a type of database partitioning that separates very large databases into smaller, faster, more easily managed parts called data shards. The word shard means a small part of a whole. In some embodiments, each shard is held on a separate database server instance, to spread load. In an embodiment, a shard contains a complete and independent instance of the TSM data processor and associated storage in file storage 108 (e.g., includes an instance of metric name index 118, metric ID to name index 120, staging files 122, persistence policies 124, and resolution databases 110). Each shard has its own, independent resolution databases and sharding files appropriate to the subset of metric names associated with the shard. In an embodiment, two instances of TSM data processor 104 are contained in a shard to provide for redundancy in case of system outages.

TSM data points 402, 404, 406, . . . 408 are received by metrics controller 105. Each TSM data point is associated with a metric name. For example, TSM data point 402 is named XX1.metricname, TSM data point 404 is named XX2.metricname, TSM data point 406 is named XX3.metricname, . . . TSM data point 408 is named XXZ-.metricname, where Z is a natural number. As part of metrics controller 105 processing, in an embodiment metrics controller 105 stores TSM data points in shards in file storage 108. For example, TSM data point XX1.metricname 402 is stored in shard 1 412, since shard 1 412 is associated with a first metric name, TSM data point XX2.metricname 402 is stored in shard 2 414, since shard 2 414 is associated with a second metric name, TSM data point XX3.metricname 406 is stored in shard 3 414, since shard 3 414 is associated with a third metric name, . . . TSM data point XXZ.metricname 408 is stored in shard Z 418, since shard Z 418 is associated with a "Z'th" metric name.

Sharding is used in embodiments of the present invention to scale metrics controller processing and file storage over many computer servers in many data centers. For example, shard 1 412 may be used to store TSM data points for data center pods 1 through 10, shard 2 414 may be used to store TSM data points for data center pods 11 through 20, and so on.

User input 420 is received by web renderer 422 to retrieve information based at least in part on TSM data points stored in file storage 108. Web renderer 422 has to query all known shards for the given TSM data points and time frames. Web renderer 422 has no knowledge of where the requested data is stored nor does it have a need for this information. Web renderer 422 can effectively query all shards in parallel and merge the resulting data set from all shards into a consistent reply to the user input query. Web renderer 422 forwards the information to dashboard 424, which formats the information for display as user output 426.

Figure 5:
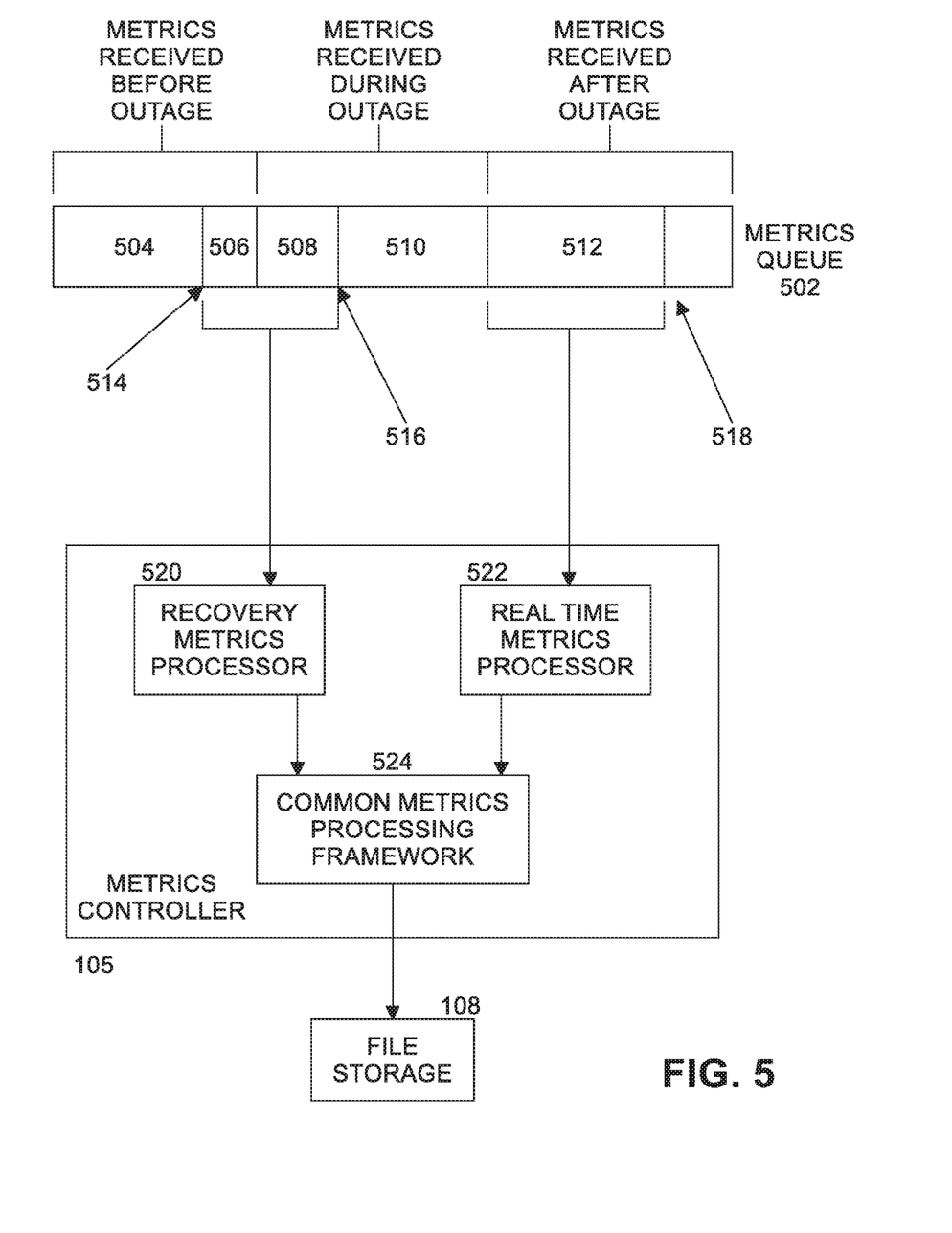
FIG. 5 is a diagram of restart processing according to some embodiments.

FIG. 5 is a diagram of restart processing according to some embodiments. In an embodiment, metrics controller 105 includes recovery metrics processor 520 to process TSM data points from metrics queue 502 during a restart, and real time metrics processor 522 to process TSM data points from metrics queue 502 while the system is operational. Both metrics processors 520, 522 perform the operations disclosed above with reference to FIGS. 1-4. Metrics controller 105 also includes common metrics processing framework 524, which provides common functions used by recovery metrics processor 520 and real time metrics processor 522 to store TSM data points in file storage 108 as described above. In an embodiment, real time metrics processor 522 is executed a higher priority process in a computing device and recovery metrics processor 520 is executed at a lower priority process in the computing device.

TSM data points are forwarded from computing devices that generate the TSM data points into metrics queue 502. In an embodiment, metrics queue 502 is stored in a memory. TSM data points are stored in the metrics queue in time order, left to right, according to FIG. 5. Metrics data received before a system outage occurs include metrics queue entries 504 and 506. TSM data points 504 are stored in metrics queue 502 before a last checkpoint is performed at 514. TSM data points 506 include data stored in the metrics queue from the start of the outage to the start of recovery processing. Recovery processing starts with the next TSM data points received after the last checkpoint at 514. Metrics data received during the system outage include metrics queue entries 508 and 510. Recovery metrics processor 520 of metrics controller 105 processes TSM data points from metrics queue entries 506 and 508. Arrow 516 points to a current position in the metrics queue that recovery metrics processor 520 is processing at a point in time. When the system outage is over, metrics data received after the outage includes block 512. Upon restart, real time metrics processor 522 of metrics controller 105 processes TSM data points stored in metric queue entries 512. Arrow 518 points to a current position in the metrics queue that real time metrics processor 522 is processing at the point in time. Metrics queue entries 510 are TSM data points that were received during the system outage but were not processed by real time metrics processor 522, and they have not yet been processed by recovery metrics processor 520. Note that TSM data points 506 get processed twice: once before restart by real time metrics processor 522 and by recovery metrics processor 520 after the restart.

Because upon restart recovery metrics processor 520 processes TSM data points received (but not processed) during the outage in parallel with real time metrics processor 522 processing newly arriving TSM data points after the restart, TSM data processor can provide up to date metrics for users which include TSM data points received during and after the outage.

Figure 6:
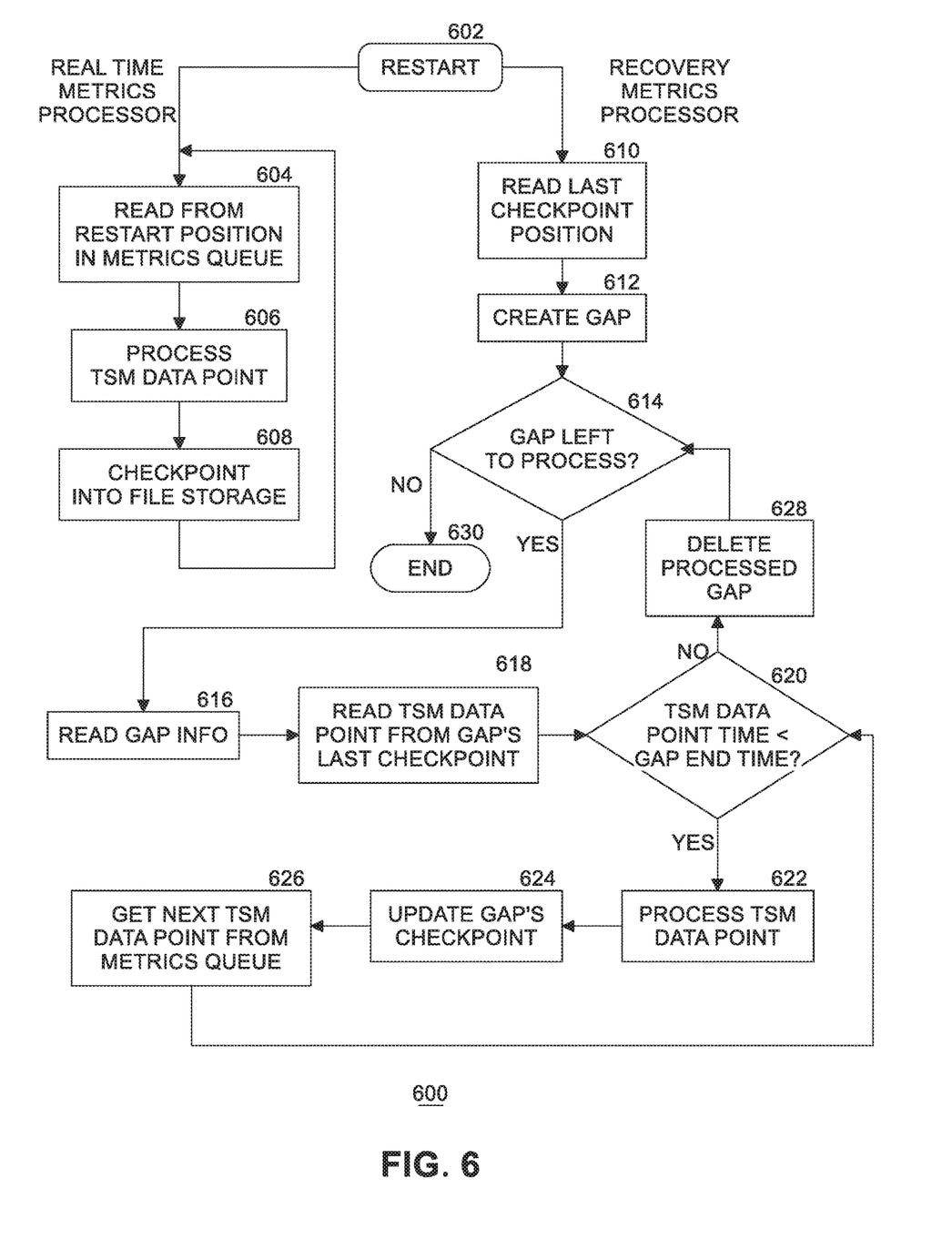
FIG. 6 is a flow diagram of restart processing according to some embodiments.

FIG. 6 is a flow diagram 600 of restart processing according to some embodiments. At block 602, restart processing begins. At block 604, real time metrics processor 522 reads a TSM data point from the restart position (e.g., the starting point of section 512) in metrics queue 502. At block 606, real time metrics processor processes the TSM data point. At block 608, real time metrics processor checkpoints the processed TSM data point into file storage 108. Real time metrics processor 522 repeats blocks 604, 606, and 608 for additional TSM data points received after the outage.

At block 610 (in parallel with performance of blocks 604 through 608), recovery metrics processor 520 reads the last checkpoint position from file storage 108. At block 612, recovery metrics processor creates a gap. The last check point position is the start of the gap and the current time is the end time of the gap. The checkpoint position of the gap is initialized to the start time of the gap. This is added to the list of gaps to be processed. The gap is defined by the start timestamp, end timestamp, and checkpoint timestamp. A checkpoint is created within a gap so as to recover from situations where the system was restarted while it was recovering from an outage. At block 614, if no TSM data points from the gap are left to process, then recovery processing ends at block 630. If there are TSM data points from the gap left to process, processing continues with block 616, where gap information is read from file storage 108. At block 618, recovery metrics processor 520 reads a TSM data point from the gap's last checkpoint in metrics queue 502. At block 620, if the TSM data point's time is not less than the gap's end time, then processing of the gap is complete and the processed gap is deleted at block 628. Processing continues in that case with block 614. At block 620, if the TSM data point's time is less than the gap's end time, then recovery metrics processor 520 processes the TSM data point at block 622. At block 624, the gap's checkpoint is updated. At block 626, recovery metrics processor gets the next TSM data point from metrics queue 502 for the gap. Processing continues with block 620.

One or more parts of the above implementations may include software and/or a combination of software and hardware. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), Flash memory, phase change memory, solid state drives (SSDs)) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists the code/data even when the electronic device is turned off (when power is removed), and the electronic device copies that part of the code that is to be executed by the processor(s) of that electronic device from the non-volatile memory into the volatile memory of that electronic device during operation because volatile memory typically has faster read/write times. As another example, an electronic device may include a non-volatile memory (e.g., phase change memory) to store the code/data when the electronic device is turned off, and that same non-volatile memory has sufficiently fast read/write times such that, rather than copying the part of the code to be executed into volatile memory, the code/data may be provided directly to the processor(s) (e.g., loaded into a cache of the processor(s)); in other words, this non-volatile memory operates as both long term storage and main memory, and thus the electronic device may have no or only a small amount of DRAM for main memory. Typical electronic devices also include a set of one or more physical network interface(s) to establish network connections (to transmit and/or receive code and/or data using propagating signals) with other electronic devices.

Figure 7:
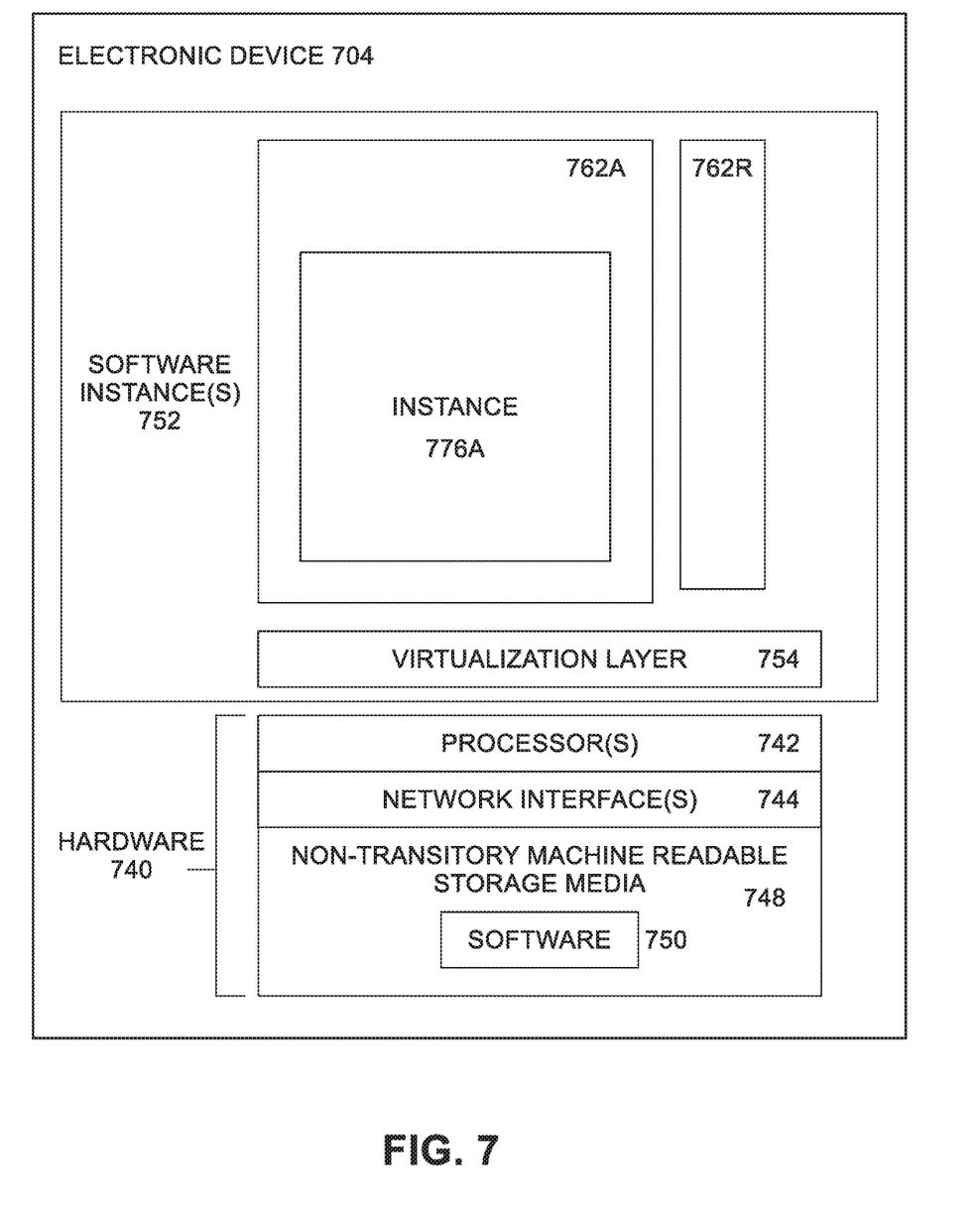
FIG. 7 illustrates an electronic device according to some implementations.

FIG. 7 illustrates an electronic device 704 according to some implementations. FIG. 7 includes hardware 740 comprising a set of one or more processor(s) 742, a set or one or more network interfaces 744 (wireless and/or wired), and non-transitory machine-readable storage media 748 having stored therein software 750. TSM data processor 104 may be implemented in one or more electronic devices 704. In one implementation, each one of a plurality of consumer devices is implemented in a separate one of the electronic devices 704 (e.g., in an end user electronic device operated by an end user; in which case, the software 750 in each such end user electronic device includes the software to implement one of the end user clients, including software to interface with a cloud computing service (e.g., an application programming interface (API), a web browser, a native client, a portal, a command-line interface, etc.)) and TSM data processor 104 is implemented in a separate set of one or more of the electronic devices 704 (in which case, the software 750 is the software to implement TSM data point processing as described herein; in operation, the end user electronic devices and the electronic device(s) implementing the cloud computing system containing TSM data processor 104 would be commutatively coupled (e.g., by a network) and would establish between them connections for requesting and providing cloud computing services. Other configurations of electronic devices may be used in other implementations.

In electronic devices that use compute virtualization, the processor(s) 742 typically execute software to instantiate a virtualization layer 754 and software container(s) 762A-R (e.g., with operating system-level virtualization, the virtualization layer 754 represents the kernel of an operating system (or a shim executing on a base operating system) that allows for the creation of multiple software containers 762A-R (representing separate user space instances and also called virtualization engines, virtual private servers, or jails) that may each be used to execute a set of one or more applications; with full virtualization, the virtualization layer 754 represents a hypervisor (sometimes referred to as a virtual machine monitor (VMM)) or a hypervisor executing on top of a host operating system (OS), and the software containers 762A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 750 (illustrated as instance 776A) is executed within the software container 762A on the virtualization layer 754. In electronic devices where compute virtualization is not used, the instance 776A on top of a host operating system is executed on the "bare metal" electronic device 704. The instantiation of the instance 776A, as well as the virtualization layer 754 and software containers 762A-R if implemented, are collectively referred to as software instance(s) 552.

Alternative implementations of an electronic device may have numerous variations from that described above. For example, customized hardware and/or accelerators might also be used in an electronic device.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue implementation.

References in the specification to "one implementation," "an implementation," "an example implementation," "some implementations," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A computing device comprising:
   one or more processors; and
   a non-transitory machine-readable storage medium having instructions stored therein, which when executed by the one or more processors, causes the computing device to:
      receive a time series metric (TSM) data point for a metric, the TSM data point indicating an identifier (ID) of the metric;
      get a persistence policy associated with the metric;
      select a first resolution database according to the persistence policy;
      store the TSM data point in the first resolution database;
      select a second resolution database according to the persistence policy; and
      store, responsive to the selecting of the second resolution database, the TSM data point in a staging file for the second resolution database, the staging file identifying one or more TSM data points to be aggregated.

2. The computing device of claim 1, comprising instructions stored therein, which when executed by the one or more processors, causes the computing device to repeat the storing of TSM data points in the first resolution database and the storing of TSM data points in the staging file for the second resolution database for a plurality of TSM data points received in a time interval.

3. The computing device of claim 2, comprising instructions stored therein, which when executed by the one or more processors, causes the computing device to, at the end of the time interval,
   sort the staging file for the second resolution database to group TSM data points by metric ID;
   aggregate the TSM data points for the metric ID from the second staging file using an aggregation rule for the metric;
   store the aggregated TSM data points in the second resolution database using sequential input/output (I/O) operations;
   select a third resolution database using the persistence policy; and
   when the third resolution database is defined, store the aggregated TSM data points in a staging file for the third resolution database.

4. The computing device of claim 3, wherein the persistence policy defines one or more of a first time resolution and a first retention time for the first resolution database, a second time resolution and a second retention time for the second resolution database, and a third time resolution and a third retention time for the third resolution database.

5. The computing device of claim 4, wherein the first time resolution is smaller than the second time resolution, and the second time resolution is smaller than the third time resolution.

6. The computing device of claim 4, wherein the first resolution database, the second resolution database, and the third resolution database are log-structured-merge (LSM) trees.

7. The computing device of claim 4, comprising instructions stored therein, which when executed by the one or more processors, causes the computing device to store the staging files, the resolution databases, and the persistence policies in a shard, using a names pace of the metric as a sharding key.

8. The computing device of claim 1, wherein a TSM data point comprises a metric name, a timestamp, and a value.

9. The computing device of claim 8, wherein a resolution database entry comprises a key field and a value field, the key field comprising the metric ID and the timestamp, and the value field comprising a TSM data point value.

10. The computing device of claim 3, comprising instructions stored therein, which when executed by the one or more processors, causes the computing device to process TSM data points received during an outage of the computing device after a restart of the computing device in parallel with processing TSM data points received after the outage.

11. A method of operating a computing device comprising:
receiving a time series metric (TSM) data point for a metric, the TSM data point indicating an identifier (ID) of the metric;
getting a persistence policy associated with the metric;
selecting a first resolution database according to the persistence policy;
storing the TSM data point in the first resolution database;
selecting a second resolution database according to the persistence policy; and
storing, responsive to the selecting of the second resolution database, the TSM data point in a staging file for the second resolution database, the staging file identifying one or more TSM data points to be aggregated.

12. The method of claim 11, comprising repeating the storing of TSM data points in the first resolution database and the storing of TSM data points in the staging file for the second resolution database for a plurality of TSM data points received in a time interval.

13. The method of claim 12, comprising, at the end of the time interval,
sorting the staging file for the second resolution database to group TSM data points by metric ID;
aggregating the TSM data points for the metric ID from the second staging file using an aggregation rule for the metric;
storing the aggregated TSM data points in the second resolution database using sequential input/output (I/O) operations;
selecting a third resolution database using the persistence policy; and
when the third resolution database is defined, storing the aggregated TSM data points in a staging file for the third resolution database.

14. The method of claim 13, wherein the persistence policy defines one or more of a first time resolution and a first retention time for the first resolution database, a second time resolution and a second retention time for the second resolution database, and a third time resolution and a third retention time for the third resolution database.

15. The method of claim 14, wherein the first time resolution is smaller than the second time resolution, and the second time resolution is smaller than the third time resolution.

16. The method of claim 14, wherein the first resolution database, the second resolution database, and the third resolution database are log-structured-merge (LSM) trees.

17. The method of claim 14, comprising storing the staging files, the resolution databases, and the persistence policies in a shard, using a names pace of the metric as a sharding key.

18. The method of claim 11, wherein a TSM data point comprises a metric name, a timestamp, and a value.

19. The method of claim 18, wherein a resolution database entry comprises a key field and a value field, the key field comprising the metric ID and the timestamp, and the value field comprising a TSM data point value.

20. The method of claim 13, comprising processing TSM data points received during an outage of the computing device after a restart of the computing device in parallel with processing TSM data points received after the outage.

21. A non-transitory machine-readable storage medium having instructions stored therein, which when executed by one or more processors of a computing device, causes the computing device to:
receive a time series metric (TSM) data point for a metric, the TSM data point indicating an identifier (ID) of the metric;
get a persistence policy associated with the metric;
select a first resolution database according to the persistence policy;
store the TSM data point in the first resolution database;
select a second resolution database according to the persistence policy; and
store, responsive to the selectin of the second resolution database, the TSM data point in a staging file for the second resolution database, the staging file identifying one or more TSM data points to be aggregated.

22. The non-transitory machine-readable storage medium of claim 21, comprising instructions stored therein, which when executed by the one or more processors, causes the computing device to repeat the storing of TSM data points in the first resolution database and the storing of TSM data points in the staging file for the second resolution database for a plurality of TSM data points received in a time interval.

23. The non-transitory machine-readable storage medium of claim 21, comprising instructions stored therein, which when executed by the one or more processors, causes the computing device to, at the end of the time interval,
sort the staging file for the second resolution database to group TSM data points by metric ID;
aggregate the TSM data points for the metric ID from the second staging file using an aggregation rule for the metric;
store the aggregated TSM data points in the second resolution database using sequential input/output (I/O) operations;
select a third resolution database using the persistence policy; and
when the third resolution database is defined, store the aggregated TSM data points in a staging file for the third resolution database.

24. The non-transitory machine-readable storage medium of claim 23, wherein the persistence policy defines one or more of a first time resolution and a first retention time for the first resolution database, a second time resolution and a second retention time for the second resolution database, and a third time resolution and a third retention time for the third resolution database.

25. The non-transitory machine-readable storage medium of claim 23, wherein the first time resolution is smaller than the second time resolution, and the second time resolution is smaller than the third time resolution.

26. The non-transitory machine-readable storage medium of claim 24, wherein the first resolution database, the second resolution database, and the third resolution database are log-structured-merge (LSM) trees.

* * * * *